United States Patent

Althausen et al.

[11] Patent Number: 5,283,040
[45] Date of Patent: Feb. 1, 1994

[54] DEVICE FOR THE PRODUCTION OF A REACTION MIXTURE FROM AT LEAST TWO FLOWABLE REACTION COMPONENTS

[75] Inventors: Ferdinand Althausen, Neunkirchen; Jürgen Wirth, Köln; Reiner Raffel, Siegburg, all of Fed. Rep. of Germany

[73] Assignee: Bayer Aktiengesellschaft, Leverkusen, Fed. Rep. of Germany

[21] Appl. No.: 898,632

[22] Filed: Jun. 15, 1992

[30] Foreign Application Priority Data

Jun. 20, 1991 [DE] Fed. Rep. of Germany ....... 4120321

[51] Int. Cl.⁵ .................... C08F 2/00; G05B 1/00; G05D 16/00; F17D 1/00
[52] U.S. Cl. ................................ 422/133; 422/105; 422/112; 137/1; 137/625.65
[58] Field of Search ............... 422/133, 112, 105; 251/129.1, 129.09; 137/625.65, 1; 366/159; 239/124, 412

[56] References Cited

U.S. PATENT DOCUMENTS

| | | | |
|---|---|---|---|
| 3,788,337 | 1/1974 | Breer | 422/133 |
| 4,396,037 | 8/1983 | Wilcox | 137/625.65 |
| 4,422,475 | 12/1983 | Aspinwall | 137/625.65 |
| 4,836,248 | 6/1989 | Stegmaier | 137/625.65 |
| 4,889,153 | 12/1989 | Zepernick et al. | 137/625.65 |
| 4,904,451 | 2/1990 | Proksa et al. | 422/133 |

Primary Examiner—Robert J. Warden
Assistant Examiner—Christopher Y. Kim
Attorney, Agent, or Firm—Joseph C. Gil

[57] ABSTRACT

In the production of a reaction mixture which forms plastic material, in particular foamed plastic material, from at least two flowable reaction components, the inlet members or other switch-over members which must be switched over in a precise fashion, are controlled by a sliding valve comprising a slide which is assigned a restoring spring which operates in opposition to a moving electromagnet, and a holding electromagnet. First, the holding electromagnet is fully activated whereupon the moving electromagnet is activated. Following the build-up of force of the moving electromagnet, the holding electromagnet is switched off so that the inlet member or other switch-over member opens abruptly.

1 Claim, 5 Drawing Sheets

DEVICE FOR THE PRODUCTION OF A REACTION MIXTURE FROM AT LEAST TWO FLOWABLE REACTION COMPONENTS

BACKGROUND OF THE INVENTION

The present invention relates to a device and a process for the production of a reaction mixture which forms plastic material (and, in particular, foamed plastic material) from two flowable reaction components, comprising storage containers and supply lines which lead via at least one servo-controlled inlet member (which generally consists of a control piston, an inlet valve, and/or a nozzle) into a mixing chamber, wherein the inlet member is assigned a sliding valve, the slide of which is assigned a moving electromagnet and a restoring spring, as known from U.S. Pat. No. 3,788,337.

Devices of this type are used in particular in polyurethane processing technology, wherein the required mixture quantity is produced in continuous fashion. The time required to form the mixture quantity is referred to as "shot time". For small mixture quantities the shot time is correspondingly short since the dispensing pumps operate with approximate delivered quantities of 50 to 100 liters/minute.

The inlet members are generally hydraulically operated, for which purpose sliding valves, which can be switched electromagnetically, are actuated. The end of the slide has the form of a magnetic core and is guided in an exciting winding, or an iron core cooperating with the slide is fixed in the exciting winding. The build-up of the magnetic field requires a certain length of time and the magnetic force must first overcome the opposing prestressing force of the restoring spring before the sliding valve commences the opening procedure. It is only then that the actual opening procedure commences, which, due to the continued build-up of the magnetic field in association with the opposing force corresponding to the spring characteristic, requires a relatively long period of time and proceeds in an unstable fashion. With a shot time of, for example, 0.4 sec, the shot time tolerance, which is governed by the build-up of the magnetic field, amounts to approximately 0.02 sec, resulting in a fluctuation in the component quantities of ±5%. If, for example, an object is produced by in situ foaming from polyurethane foamed material, too large a mixture quantity leads to a higher density than desired. Too small a mixture quantity leads to too low a density, or in extreme circumstances the mold cavity is not entirely filled. If, in the case of separately controlled inlet members for the reaction components, the opening procedures of these inlet members differ from one another, the mixture ratio is also adulterated during the initial phase of the opening procedure. An adulterated mixture ratio of the reaction components can undesirably change the physical properties of the end product.

The aim of the present invention was to discover a device and a process with which the opening procedure of the inlet members can be monitored more easily and can be reduced in length in order to ensure a precise mixture quantity and a precise mixture ratio.

DESCRIPTION OF THE INVENTION

Figure 1:
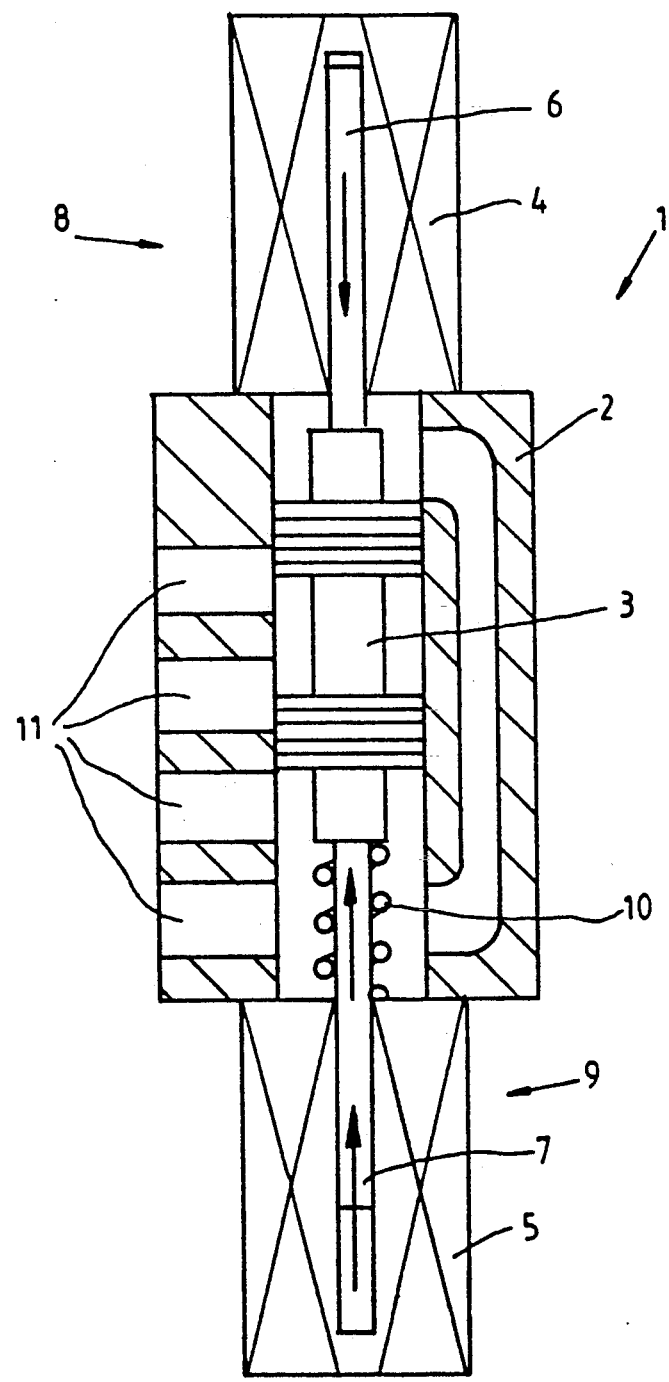
FIG. 1 is a sectional diagram of the new sliding valve.

The above aim is fulfilled in that a holding electromagnet which operates in opposition to the moving electromagnet is additionally provided for the slide. The holding electromagnet ensures that the slide is abruptly reversible, whereby the opening procedure is reduced to a minimal time interval.

U.S. Pat. No. 4,904,451 relates to a process and device in which in order to keep the reversing times from circulation of the reaction components to mixing and vice versa as short as possible for the purpose of good mixing in the initial and end phases in the preparation of flowable reaction mixtures by high-pressure mixing, the holding pressure applied to the flow reversing element is maintained by a releasable non-return valve until the full hydraulic reversing pressure has built up on the opposite side, and only then is the non-return valve released. The above process is, however, not suitable for solving the problem of the present invention, i.e. that of obtaining accurately reproducible shot times, since both the holding pressure and the reversing pressure are subject to such a large number of influential factors that no further reduction can be obtained in the fluctuations occuring in the millisecond range.

The new process for the operation of the device is based upon the fact that the inlet member or other switch-over member is opened by actuating the sliding valve in that the slide is urged against the restoring spring by the activation of the moving electromagnet and at the end of the mixing process is returned from the restoring spring into the closed position by the de-activation of the moving electromagnet.

The novelty consists in that in order to open the inlet member or other switch-over member, first the holding electromagnet is activated, and only after a delay time when the force has completely built-up is the moving electromagnet activated. Following the build-up of the full magnetic force of the moving electromagnet the slide is brought into the open position by the deactivation of the holding electromagnet. In this way, during the switch-over procedure, the full magnetic force of the moving electromagnet abruptly comes into effect, whereby the switch-over time is drastically reduced. Naturally, the sum of the force of the restoring spring and the holding force of the holding electromagnet must be greater than the moving force of the moving electromagnet. The ends of the slide, together with the associated windings, form the electromagnets. The new sliding valve is suitable both for hydraulic control units and also for pneumatic control units.

Depending upon the design of the device, in some cases one single sliding valve will be sufficient. However, each of the members which are to be reversed or groups thereof can also each be provided with assigned sliding valves which are controlled with a precise time delay.

The most frequently employed inlet members are injection nozzles, injection valves and/or control pistons. These have long constituted prior art in polyurethane processing machines.

The novel sliding valve can be used in devices of the type described in the introduction not only for reversing the inlet members, but also for controlling other valves or slides wherein an abrupt switch-over is of importance, such as for example cleaning pistons, switch-over valves in reflux lines, and shut-off valves.

The new device, in the form of a plurality of exemplary embodiments, is illustrated purely schematically in the drawing and explained in detail below.

In FIG. 1, the sliding valve 1 comprises a housing 2 with a slide 3 which is guided therein and the ends of which have the form of iron cores 6, 7, surrounded by windings 4, 5, of a moving electromagnet 8 and a holding electromagnet 9 respectively. The slide 3 is also associated with a restoring spring 10 which operates in opposition to the moving electromagnet S. When the electromagnets 8, 9 are activated, the sum of the holding force of the holding electromagnet 9 and the force of the restoring spring 10 must exceed the force of the moving electromagnet 8. The terminals are referenced 11.

Figure 2:
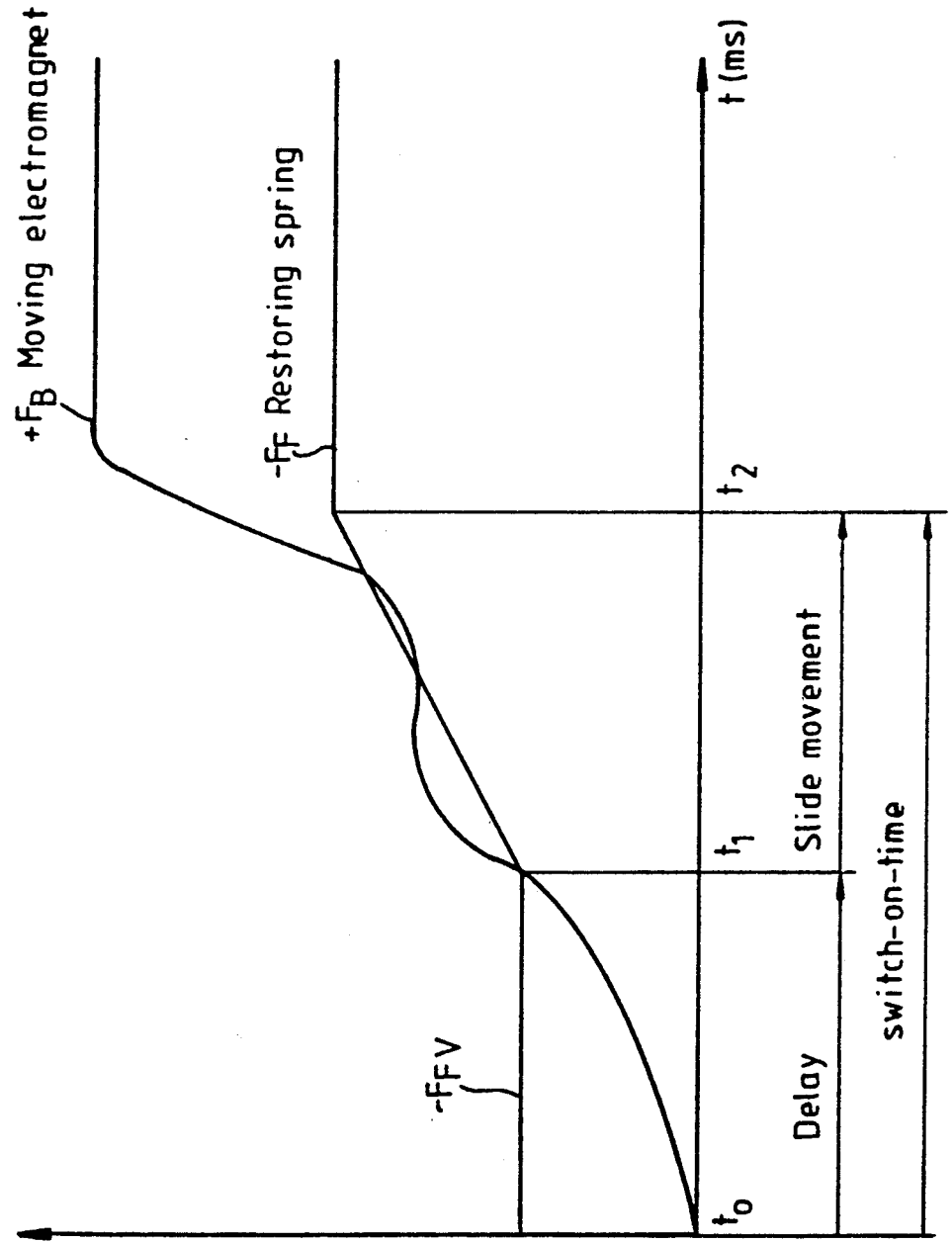
FIG. 2 is a graph showing forces over time during the operation of the sliding valve of the prior art.

FIG. 2 illustrates the build-up of the force $+F_B$ of the moving electromagnet and the opposing force $-F_F$ of the restoring spring in prior art devices. At the time $t_0$, the moving electromagnet is activated, the restoring spring 10 being subject to an initial stress which opposes the moving force of the moving electromagnet 8. In the delay time $t_0-t_1$ the magnetic force $+F_B$ has increased to such an extent that it exceeds the prestressing force $-F_{FV}$ of the restoring spring 10. This delay amounts, for example, to approximately 55 to 80 ms. During the time interval $t_1-t_2$ of approximately 12 ms the movement of the slide takes place, the spring force $-F_F$ increasing in accordance with its characteristic curve. The magnetic force $+F_B$ also increases in time-dependent and movement-dependent fashion. Here the magnetic force $+F_B$ is not always predominant, so that the movement is discontinuous and sluggish. At the time $t_2$ the movement of the slide has been completed; the magnetic force $+F_B$ attains its maximum value and distinctly exceeds the opposing spring force $-F_F$.

Figure 3:
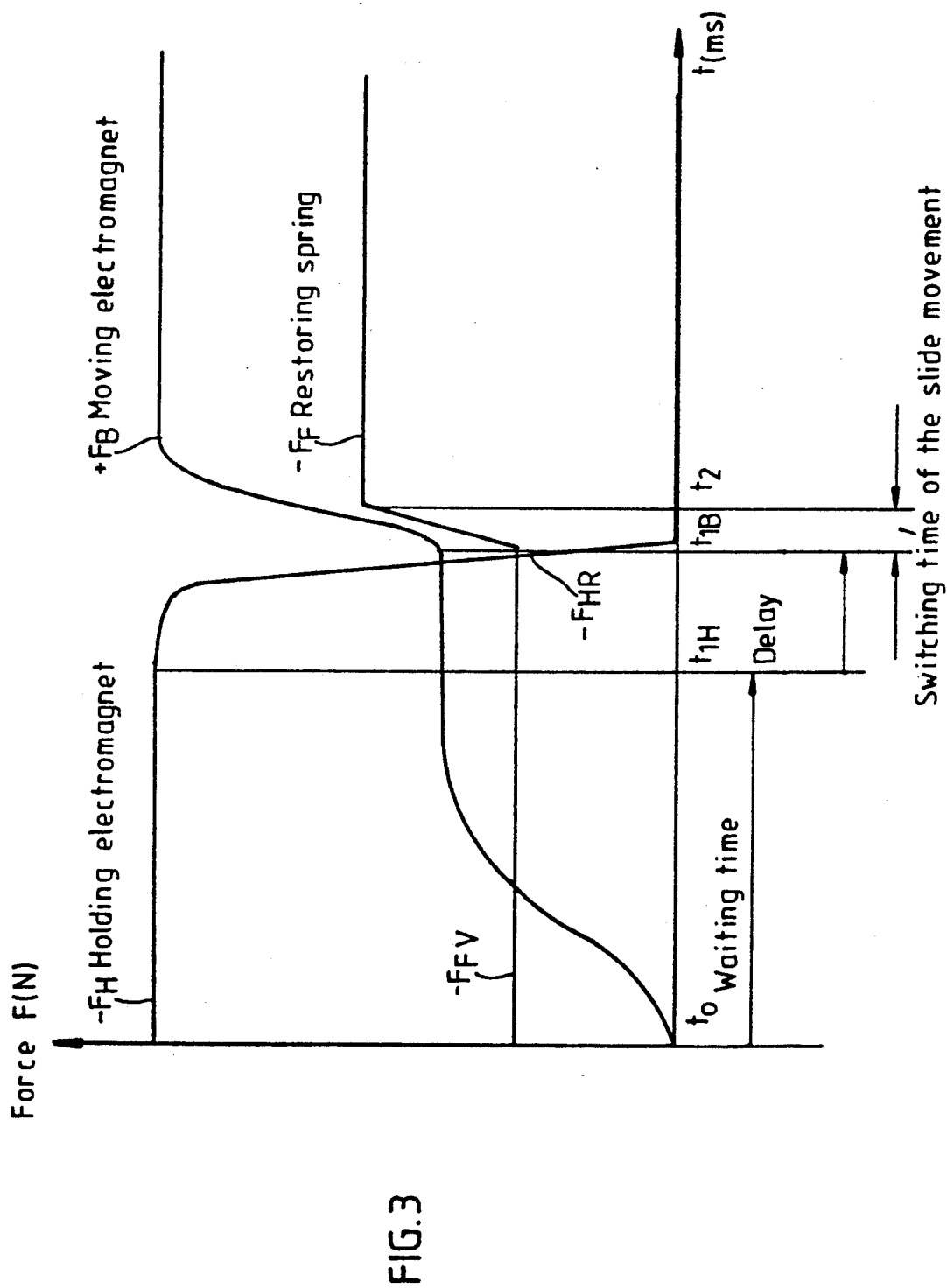
FIG. 3 is a graph showing forces over time during the operation of the sliding valve of the present invention.

By way of contrast, FIG. 3 illustrates a substantially more favorable build-up of force and switching process of the new sliding valve. At an arbitrary time prior to $t_0$ the holding electromagnet 9 is excited so that the slide 3 is subjected to the maximum holding force $-F_H$ and the initial stress $-F_{FV}$ of the restoring spring. At the time $t_0$ the moving electromagnet 8 is excited, with the result that the maximum force $+F_B$ assigned to the position of the magnetic core builds up. However, it remains distinctly below the sum of the force of the spring initial stress $-F_{FV}$ and the holding force $-F_H$. At the time $t_{1H}$ the holding electro-magnet 9 is switched off, whereby the magnetic force $-F_H$ disintegrates abruptly. At the time $t_{1B}$ the magnetic force $-F_H$ has disintegrated to such an extent that the force $+F_B$ is greater than the spring initial stress $-F_{FV}$ and the residual force $-F_{HR}$ of the holding electromagnet 9. The time interval between $t_{1H}$ and $t_{1B}$ amounts, for example, to approximately 5 ms. At $t_{1B}$ the movement of the slide 3 commences and within 1 ms the switching time and the movement of the slide 3 have concluded at $t_2$.

If the two diagrams corresponding to FIGS. 2 and 3 are compared, it will be seen clearly that in the case of the new sliding valve 1, the build-up of the magnetic force in the moving electromagnet 8 largely no longer overlaps with the movement phase and that the movement of the slide 3 is precisely adhered to and proceeds approximately uniformly. Here the movement of the slide is abrupt. On the closure of the inlet member or other switch-over member controlled in this way, the problem does not arise since on the disconnection of the moving current the magnetic field disintegrates abruptly and thus the slide 3 is abruptly reversed.

Figure 4:
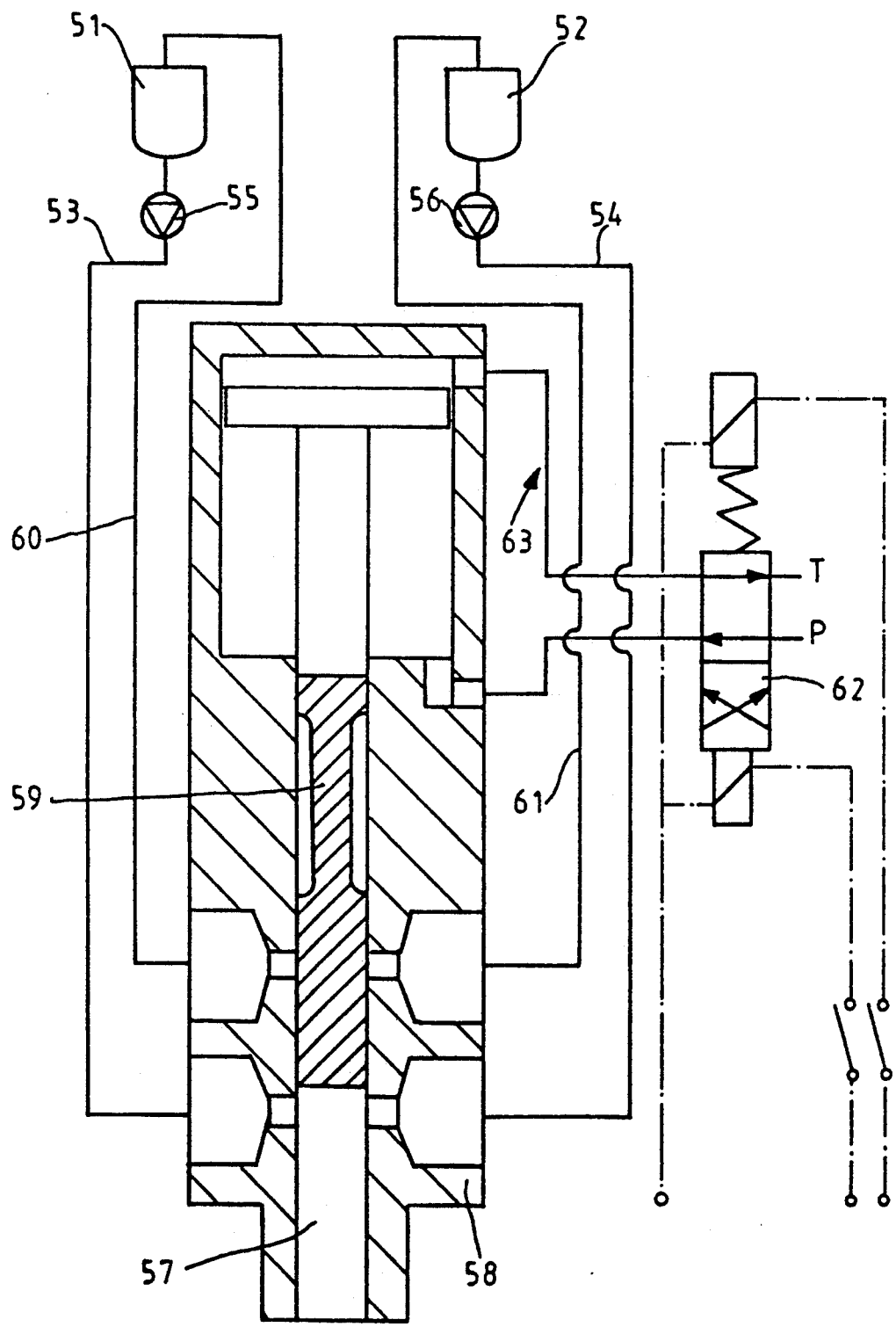
FIG. 4 illustrates a device with a control piston as inlet member.

In FIG. 4 the device comprises storage containers 51, 52, from which supply lines 53, 54 lead via dispensing pumps 55, 56 into the mixing chamber 57 of a mixing head 58 which comprises a control piston 59. Reflux lines have been referenced 60 and 61. The control piston 59 can be actuated by means of a sliding valve 62 which forms part of a hydraulic control system 63. The sliding valve 62 has the construction corresponding to FIG. 1.

Figure 5:
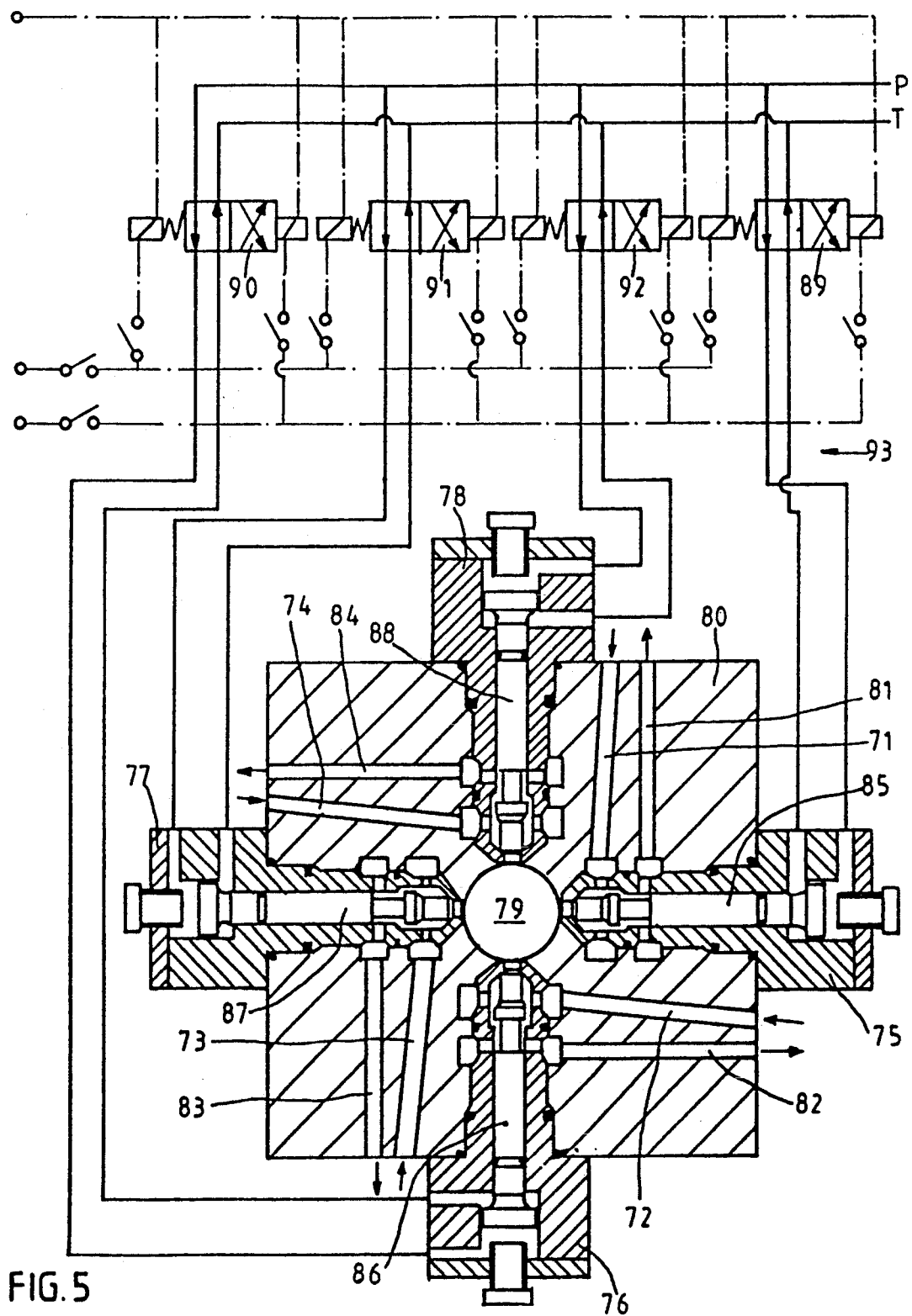
FIG. 5 illustrates a device with four injection nozzles as inlet members.

In FIG. 5 the device comprises storage containers, dispensing pumps (not shown for reasons of clarity) and supply lines 71, 72, 73, 74 which lead via injection nozzles 75, 76, 77, 78 into the mixing chamber 79 of a mixing head 80. The latter comprises a cleaning piston (not shown). From the injection nozzles 75, 76, 77, 78, reflux lines 81, 82, 83, 84 return to the storage containers. The pins 85, 86, 87, 88 of the injection nozzles 75, 76, 77, 78 are controlled via separate sliding valves 89, 90, 91, 92 which form part of a hydraulic control system 93. The construction of the sliding valves 89, 90, 91, 92 corresponds to that shown in FIG. 1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a device for the production of a reaction mixture from at least two flowable reaction components, comprising storage containers and supply lines which lead via at least one servo-controlled inlet member into a mixing chamber, where the inlet member or other switch-over member is associated with at least one sliding valve, a slide having a first and second opposing sides which is activated by a moving electromagnet on the first side of the slide causing movement of said slide against the force of a restoring spring, the improvement comprising a holding electromagnet in the second opposing side of the slide, the activation of which prevents movement of said slide and which when activated, opposes the force of said moving electromagnet.

* * * * *

UNITED STATES PATENT AND TRADEMARK OFFICE
CERTIFICATE OF CORRECTION

PATENT NO. : 5,283,040
DATED      : February 1, 1994
INVENTOR(S): Ferdinand Althausen et al It is certified that error appears in the above-indentified patent and that said Letters Patent is hereby corrected as shown below:

Column 3, line 10, delete "the sliding valve I" and insert
—the sliding valve 1—

Column 3, line 16, delete "the moving electromagnet S" and insert
—the moving electromagnet 8—

Signed and Sealed this

Thirty-first Day of January, 1995

*Attest:*

BRUCE LEHMAN

*Attesting Officer*  *Commissioner of Patents and Trademarks*